D. NETTENSTROM.
POWER TRANSMISSION MECHANISM.
APPLICATION FILED JULY 27, 1910. RENEWED MAY 17, 1911.
1,024,742.
Patented Apr. 30, 1912.
3 SHEETS—SHEET 1.
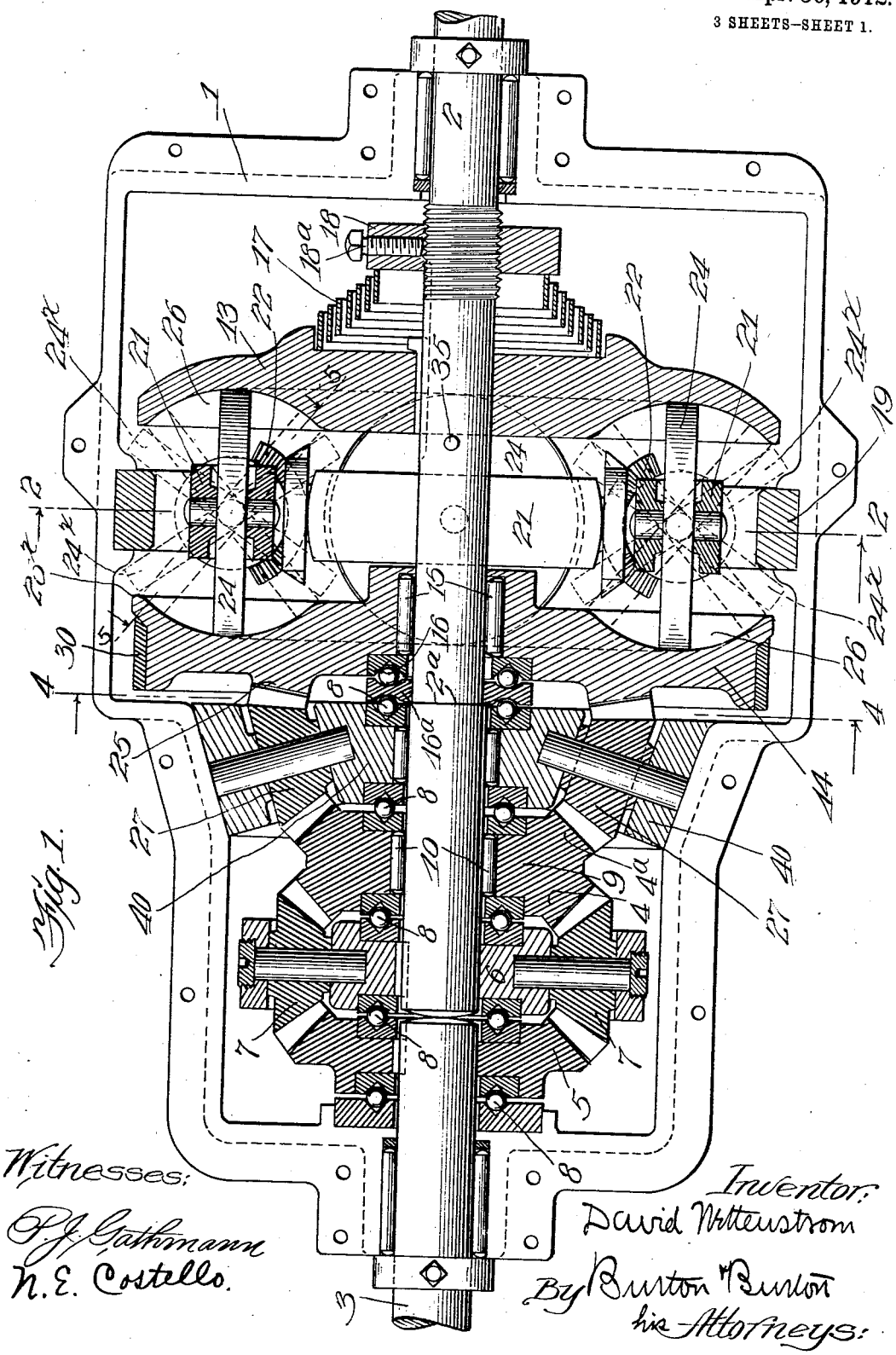

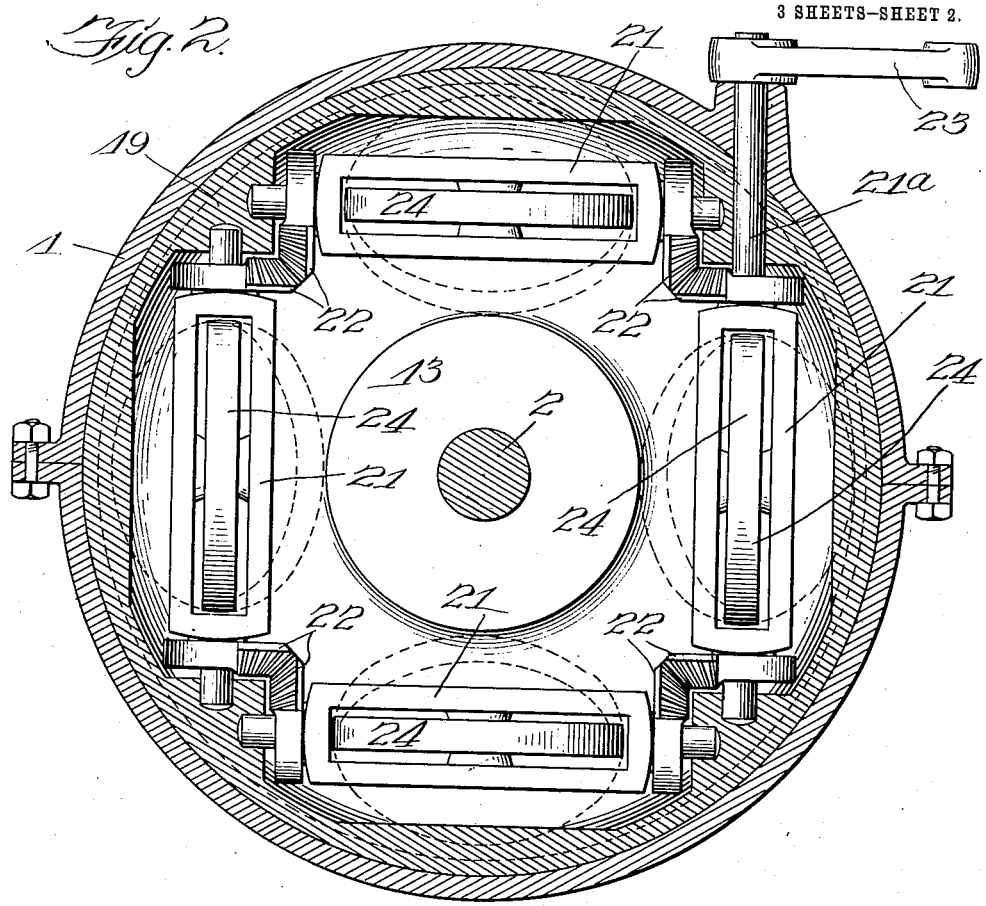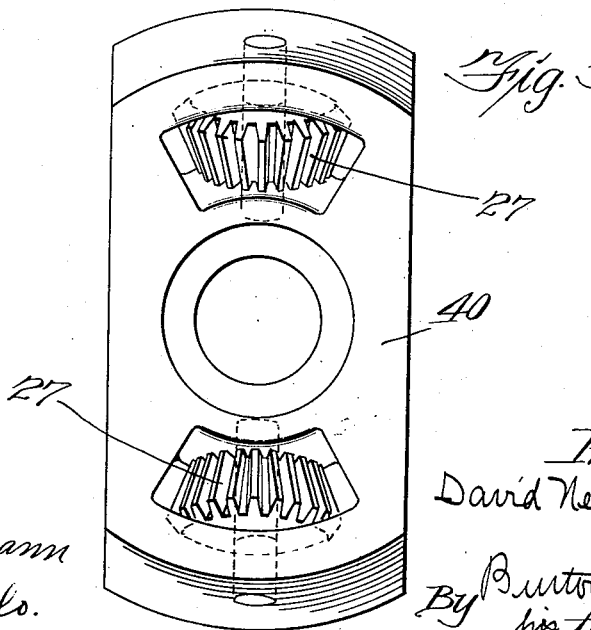

D. NETTENSTROM.
POWER TRANSMISSION MECHANISM.
APPLICATION FILED JULY 27, 1910. RENEWED MAY 17, 1911.
1,024,742.
Patented Apr. 30, 1912.
3 SHEETS—SHEET 3.
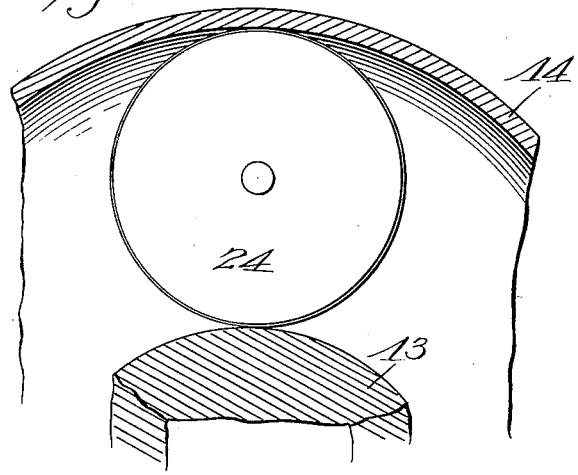
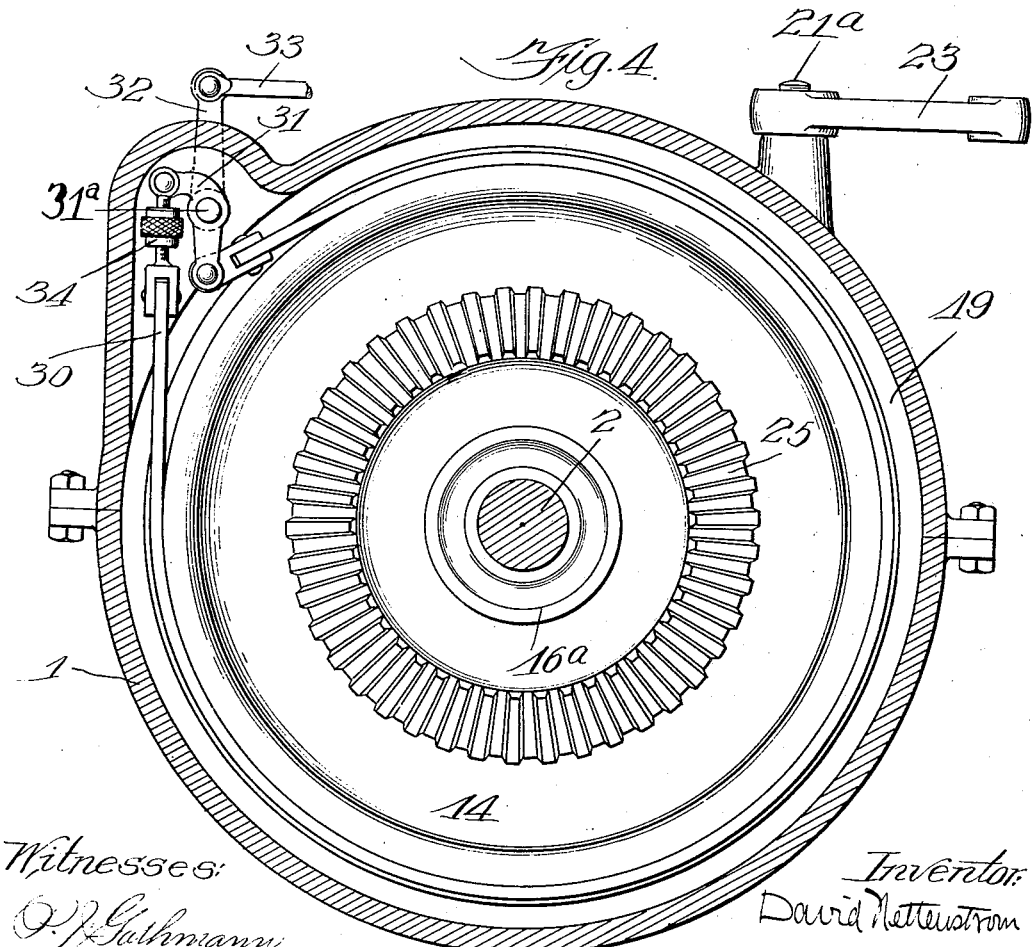
Witnesses:
O. J. Gathmann
N. E. Costello.
Inventor:
David Nettenstrom
By Burton & Burton
his Attorneys.

UNITED STATES PATENT OFFICE.

DAVID NETTENSTROM, OF CHICAGO, ILLINOIS, ASSIGNOR OF ONE-HALF TO CHARLES H. EDER, OF CHICAGO, ILLINOIS.

POWER-TRANSMISSION MECHANISM.

1,024,742.   Specification of Letters Patent.   Patented Apr. 30, 1912.

Application filed July 27, 1910, Serial No. 574,036. Renewed May 17, 1911. Serial No. 627,792.

*To all whom it may concern:*

Be it known that I, DAVID NETTENSTROM, a citizen of the United States, residing at Chicago, in the county of Cook and State of Illinois, have invented new and useful Improvements in Power-Transmission Mechanism, of which the following is a specification, reference being had to the accompanying drawings, forming a part thereof.

The purpose of this invention is to provide an improved mechanism for power transmission, particularly adapted for transmission under circumstances and for uses in which speed variation and reversion must be provided for.

It consists of the elements and features of construction shown and described as indicated in the claims.

In the drawings:—Figure 1 is an axial section of a gear train and its mountings embodying this invention. Fig. 2 is a section at the line 2—2 on Fig. 1. Fig. 3 is an elevation of a detached element of the structure comprising a fixed bridge or diaphragm for gear bearings and grooves therein. Fig. 4 is a section at the line 4—4 on Fig. 1. Fig. 5 is a detail section at the line 5—5 on Fig. 1.

The structure shown in the drawings comprises a casing, 1, adapted to be fixedly mounted. In this casing there are journaled two co-axial shafts, 2 and 3, hereinafter referred to respectively as the driving and driven shafts. For the driving shaft, 2, there is provided a bearing at one end of the casing and a second bearing in a bridge or diaphragm, 40, intermediate the ends of the casing. The driven shaft, 3, being short as to its length within the casing, has only a single bearing in the casing at the end opposite that in which the driving shaft has the first-mentioned bearing. The two shafts, 2 and 3, are connected by a differential gear train of well-known construction comprising bevel gears, 4 loose and 5, fast on the shafts, 2 and 3, respectively, a cross-head, 6, fast on the shaft, 2, and bevel pinions, 7, 7, journaled at opposite ends of said cross-head, each meshing with both the gears, 4 and 5. This differential gear train is positioned between the journal bearing of the shaft, 3, in the casing, and the journal bearing of the shaft, 2, in the bridge, 40. The gears, 4 and 5, and the cross-head, 6, are spaced from each other and from the bearings of the shafts, 2 and 3, in the cross-head, 6, and end of the casing respectively, by ball bearings, 8, 8, 8, 8, which take the axle thrust or pressure, if any, resulting from the reaction of the gears as well as the radial pressure. In addition, the gear, 4, which, as hereinafter explained, is rigid with an oppositely-facing gear, 9, has roller bearings, 10, interposed between it and the shaft, 2.

On the shaft, 2, there are two wheels or disks, 13 and 14, the first being feathered on the shaft for rotation therewith, and the second being loose on the shaft and provided with roller bearings, 15, and ball bearings, 16, for the endwise or axial thrust, the latter bearing comprising a collar, $16^a$, which forms one member of one of the ball bearings, 8, with which the cross-head, 6, is provided as above stated, said collar, $16^a$, being stopped against a shoulder, $2^a$, formed on the shaft, 2, by reducing it from said shoulder outward, as shown in Fig. 1. The wheel or disk, 13, feathered on the shaft, 2, for revolving with and sliding on the same, is pressed toward the wheel, 14, by a spring, 17, stopped at its outer end by the collar, 18, screwed on to the shaft, 2, and also provided with a set-screw, $18^a$, for preventing it from working back along the thread. Intermediate the two wheels, 13 and 14, the case, 1, has a bridge or diaphragm, 19, in which there are mounted a plurality,—as illustrated, four,—of friction wheel carriers, 21, said carriers being pivoted in said diaphragm with their pivotal axes all in the same plane at right angles to the axis of the shaft, 2, and at right angles to each other, corresponding to the number of said pivoted friction wheel carriers, which number, being four in the structure illustrated, causes said axes to be the four sides of a square. Each of said friction wheel carriers, 21, has at each end a bevel gear, 22, meshing with the corresponding bevel gear of the next adjacent carrier, so that all four of the carriers are connected up in an endless circuit for rocking simultaneously and equally whenever any one of them is rocked; and one of the carriers has its spindle, $21^a$, extended out through the diaphragm and casing and exteriorly provided with a lever arm, 23, for rocking it. Any suitable means not shown may be connected to said lever arm to rock the carriers and hold them in any position to which they may be rocked. In each carrier there is journaled a friction wheel, 24, and the opposed faces of the wheels, 13 and 14, are each provided with an annular groove, 26, whose contour in section radial with respect to the wheel is that of a segment of a circle about the point of intersection of the axis of either wheel, 24, and the pivotal axis of the carrier in which such wheel is mounted, so that said friction wheels spanning the interval between the opposed faces of two wheels, 13 and 14, and specifically between the opposed grooves of said faces, operate to hold the two wheels, 13 and 14, spaced apart the same distance throughout the entire range of movement of the carriers, 21, rocking about their pivotal axes in the diaphragm, 20. The friction wheels are thus adapted to transmit rotary movement from the wheel, 13, to the wheel, 14, in reverse direction, the spring, 17, supplying the necessary pressure, and to change the speed of the driven wheel, 14, according to the adjustment of said friction wheels transmitting equal motion from one wheel to the other when said friction wheels are adjusted parallel to the axis of the shaft, 2, but reducing the speed of the wheel, 14, when they are adjusted obliquely in such direction that their contact with the wheel, 14, is farther from the axis than their contact with the wheel, 13, and so as to increase the speed of the wheel, 14, when they are adjusted obliquely in the opposite direction, the two extreme oblique positions for full transmission of the motion being shown in dotted lines in Fig. 1, and the intermediate position for transmission of motion without change of speed but with reversal of direction only being shown in full line. The wheel, 14, on the side toward the differential gear train is provided with a gear rim, 25, and intermediate said wheel and the initial wheel, 4, of the differential gear train there is mounted the diaphragm or bridge, 40, hereinbefore mentioned, rigid with the casing, having journaled in its pinions, 27, 27, meshing at one side with said gear rim, 25, and at the other side with a bevel gear, 4ª, integral with the initial bevel gear, 4, of the differential gear train. Preferably, the gear rim, 25, is of greater diameter than the gear, 4ª, so that the former transmits accelerated rotary movement to the latter.

Upon considering the train of mechanism above described, it will be observed that between the wheel, 13, which is the initial driving element of the train, and the initial gear, 4, of the differential gear train, the direction of rotation is twice reversed; first, at the frictional transmission from the wheel, 13, to the wheel, 14, by means of the friction wheels, 24, and again by the gear transmission from the gear rim, 25, through the pinions, 27, 27, to the bevel gear member, 4ª, and the initial gear, 4, of the differential gear train; so that said initial gear of the differential gear train has the same direction of rotation as the initial power-transmitting wheel, 13,—that is, the same direction as the shaft, 2. According to the well known law governing the operation of differential gear trains, it will be understood that if the initial gear, 4, of said train is by any means held at rest, the final gear, 5, and its shaft, 3, will be rotated at twice the speed and in the same direction as the driving shaft, 2, and that if said initial gear, 4, of the differential train is revolved in the same direction as the shaft, 2, and at the same speed, the final gear, 5, and driven shaft, 3, will have that same speed; and that any increase of the speed of the gear, 4, over that of the shaft, 2, in the same direction (and it will be seen that it must revolve in the same direction), will to the amount of such excess diminish the speed of the final gear, 5, of the train and the driven shaft, 3, and any diminution of the speed of the wheel, 4, below that of the shaft, 2, will to the extent of such diminution increase the speed of the final gear, 5, and driven shaft, 3. It will be understood, therefore, that if the speed of the gear, 4, is increased to double that of the shaft, 2, the final gear, 5, and driven shaft, 3, will remain at rest, and that if the speed of said gear, 4, in the same direction of the shaft, 2, be increased to more than double that of the shaft, the excess of said speed above twice the speed of the driving shaft will be the reverse speed of the final gear, 5, and driven shaft, 3. The diameter and range of swing of the friction wheels, 24, for operative transmission of rotation from the wheel, 13, to the wheel, 14, in the construction shown in the drawings is such as to carry their middle point of frictional contact with the said wheels, respectively, from a minimum distance from the axis of the shaft, 2, to a maximum distance equal to twice that minimum distance, so that at the position of said friction wheels for giving the wheel, 14, the greatest speed, said greatest speed will be twice that of the wheel, 13, and at the opposite limit of the range of adjustment of said friction wheels, the speed of the wheel, 14, will be half that of the speed of the wheel, 13, making the maximum speed of the wheel, 14, four times its minimum speed with a uniform speed of the wheel, 13. In the structure shown in the drawings, the gear, 25, is one-fourth larger than the gear, 4ª, and transmits accelerated motion in that proportion to the last-mentioned wheel and initial wheel of the differential gear train. These relative proportions are by no means essential, but are mentioned in order to afford a basis for stating by way of illustration the range of change of speed of which the device is susceptible, and the means of taking advantage of this range. When the friction wheels, 24, are in intermediate position, as shown in full line in Fig. 1, so that the wheel, 14, has the same speed as the wheel, 13, but in the opposite direction, the initial gear, 4, of the differential gear train will have the speed of one hundred twenty-five revolutions to one hundred of the wheel, 13, and shaft 2, which, being twenty-five in excess of the speed of the cross-head, 6, will cause the final gear, 5, of the differential train and the driven wheel, 3, to have a speed twenty-five less than said shaft, 2, in the same direction. When the wheels, 24, are adjusted so as to give to the wheel, 14, a speed of one hundred sixty revolutions to one-hundred revolutions of the wheel, 13, the gear, 4, receiving two-hundred revolutions in the same direction, being one-hundred in excess of that of the cross-head, 6, will cause the wheel, 5, and driven shaft, 3, to stand at rest. Further adjustment of the wheels, 4, in the same direction,—that is, for further increasing the speed of the wheel, 14,—will cause the shaft, 3, to be rotated in the reverse direction to the shaft, 2, at a speed corresponding to the extent of said further adjustment of the friction wheels, 24. The adjustment of the wheels, 24, in the opposite direction from the position at which they cause the shaft, 3, to be at rest, will cause that shaft to be rotated in the same direction with the shaft, 2, at a speed which will equal that of the shaft, 2, when the position of the wheels, 24, is such as to cause the wheel, 14, to have eighty revolutions for one-hundred revolutions of the shaft, 14, since that will give to the wheel, 4, one-hundred revolutions in the same direction as the shaft, 2; and as said wheels, 24, are adjusted from that position still farther in the same direction,—that is, for further diminishing the speed of the wheel, 14,—the speed of the shaft, 3, will increase, and (with the parts proportioned as illustrated in the drawings and as above stated) when the wheels, 24, are at the extreme position for reducing the speed of the wheel, 14, shown in dotted line in Fig. 1, giving the wheel, 14, fifty revolutions to one-hundred of the wheel, 13, and the gear, 4, in consequence sixty-two and one-half revolutions, or thirty-seven and one-half revolutions less than the shaft, 2, the gear, 5, and driven shaft, 3, will have a speed of one-hundred-thirty-seven and one-half revolutions.

The wheel, 14, is provided with a brake strap, 30, of familiar construction, provided with means outside the casing for tightening it on said wheel, consisting of a bell-crank lever, 31, on a rock shaft 31$^a$ having an operating arm, 32, which may be operated by a link, 33, extending to any convenient place and provided with any convenient connections not shown for operating and securing it; the other arm, 33, of the bell crank being connected to the opposite end of the strap and provided with a turn buckle, 34, in the connection for properly adjusting the strap to cause it to tighten on the wheel. When by the operation of this brake or any equivalent means the wheel, 14, is held at rest, causing the wheel, 4, to be also held at rest, the shaft, 3, it will be seen, will be revolved in the same direction as the shaft, 2, at double the speed of the latter shaft. By holding the wheel, 14, by means of the brake so that some slip can occur,— that is, not holding it absolutely at rest,— any speed intermediate double that of the shaft, 2, and the speed for which the wheels, 24, are adjusted may be obtained. Since the increase of speed caused by thus holding the wheel, 14, will be obtained at the expense of the frictional waste caused by the slipping of the friction wheels, 24, provision may be made for throwing said wheels entirely out of transmitting relation to the wheels, 13 and 14, when the brake strap is to be applied for higher speed than can be obtained by the adjustment of the friction wheels, 24. For this purpose, said friction wheels, 24, may be swung to the position shown in dotted line, 24$^x$, where they are out of contact with the wheels, 13 and 14. In order that the wheels, 13 and 14, may not in that case be forced together by the spring, 17, too close to permit the reëntry of the wheels, 24, between them, a stop pin, 35, may be provided on the shaft, 2, just a little inward of the point at which the wheel, 13, would normally be stopped by the interposition of the wheels, 24, between it and the wheel, 14, and the inner faces of the two wheels, 13 and 14, may be shaped beyond the inner and outer circumferences of the grooves, 26, in curves deflected outward from the outer of said grooves, as shown at 26$^x$, so as to form leads along which the friction wheels, 24, may reënter between the wheels, 13 and 14.

The casing, 1, is completely closed except as to the driving and driven shafts extending through its ends, the rock shaft or spindle for adjusting the friction pulleys and the rock shaft for operating the brake; and the roller bearings through which the driving and driven shafts protrude are guarded at their inner ends by washers, so that the casing may be filled to any desired extent with lubricant, the entire train thus running in the lubricant.

I claim:—

1. A power transmission mechanism, comprising a driving shaft; a differential gear train consisting of an initial gear, a final gear, an idler gear connecting them, and a carrier for the idler mounted for rotation about the common axis of the initial and final gears; and driving connections from the shaft to the initial gear and to the idler carrier of the train, adapted for rotating them both in the same direction, one of said connections comprising two wheels on the shaft, one mounted for rotation therewith and the other loose thereon, and frictional idler wheels operatively connecting them.

2. A power transmission mechanism, comprising a driving shaft; a differential gear train consisting of an initial gear, a final gear, an idler gear connecting them, and a carrier for the idler mounted for rotation about the common axis of the initial and final gears; driving connections from the shaft to the initial gear and to the idler carrier of the train, adapted for rotating them both in the same direction, one of said connections comprising two wheels on the shaft, one mounted for rotation therewith and the other loose thereon, frictional idler wheels operatively connecting them, and means for adjusting the parts of said frictional connection for varying the speed communicated thereby.

3. A power transmission mechanism, comprising a driving shaft; a differential gear train consisting of an initial gear, a final gear, an idler gear connecting them, and a carrier for the idler mounted for rotation about the common axis of the initial and final gears; driving connections from the shaft to the initial gear and to the idler carrier of the train, adapted for rotating them both in the same direction, one of said connections comprising two wheels on the shaft, one mounted for rotation therewith and the other loose thereon, frictional idler wheels operatively connecting them, and means for adjusting said idlers for varying the speed communicated thereby.

4. A power transmission mechanism comprising a driving and a driven shaft; a differential gear train connecting said shafts; means for actuating the initial gear wheel of the differential gear train from the driving shaft comprising a positive speed-accelerating connection and a frictional speed-varying connection and means for adjusting the latter.

5. A power transmission mechanism comprising a driving and a driven shaft; a differential gear train connecting said shafts; means for actuating the initial gear wheel of the differential gear train from the driving shaft comprising a gear wheel loose on the driving shaft, and direction-reversing gear-connections from said loose gear to said initial gear; a wheel mounted for rotation with the driving shaft, and frictional direction-reversing transmission devices from said last-mentioned wheel to said loose gear wheel.

6. A power transmission mechanism comprising a driving and a driven shaft; a differential gear train connecting said shafts; a casing in which said shafts are journaled; means for actuating the initial gear wheel of the differential gear train from the driving shaft comprising two wheels on the driving shaft, one mounted for rotation therewith and the other loose thereon; frictional transmission and direction-reversing wheels interposed between said two wheels, and bearings for said frictional transmission wheels mounted on the casing; a gear rigid with said loose wheel and transmission and direction-reversing gear wheels journaled on the casing connecting the gear rigid with the loose wheel with the initial gear of the variable gear train, and means for adjusting the frictional transmission wheels relatively to the wheels between which they are interposed for varying the speed transmitted from one to the other.

7. A power transmission mechanism comprising a driving and a driven shaft; a casing in which they are journaled; a differential gear train which connects them; means for actuating the initial gear wheel of the differential train from the driving shaft comprising two direction-reversing connections, one positive and the other frictional, and means for adjusting the parts of the frictional connection to vary the speed transmitted.

8. A power transmission mechanism comprising a driving and a driven shaft, a casing in which they are journaled; a differential gear train which connects them; means for actuating the initial gear wheel of the differential train from the driving shaft comprising two direction-reversing connections, one invariable and the other variable, and means for adjusting the variable connection to vary the speed transmitted.

9. A power transmission mechanism comprising a driving and a driven shaft; a casing in which they are journaled; a differential gear train which connects them; means for actuating the initial gear wheel of the differential train from the driving shaft comprising a wheel mounted for rotation with the driving shaft; a second wheel facing the same mounted loose on the shaft; a frictional transmission wheel mounted on the casing interposed between said two last-mentioned wheels for transmitting rotation from one to the other in reverse direction; means for adjusting such frictional transmission wheel to vary the speed of the reverse motion transmitted; a gear rigid with said loose wheel, and gears journaled on the casing connecting said gear with the initial gear of the differential gear train.

10. A power transmission mechanism comprising a driving and a driven shaft; a casing in which they are journaled; a differential gear train connecting them; means for actuating the initial gear wheel of the differential train from the driving shaft comprising a wheel loose on said shaft having a gear rigid with it; gears journaled on the casing connecting said last-mentioned gear with the initial gear of the differential gear train; a wheel mounted for rotation with the driving shaft at the opposite side of said loose wheel from the differential gear train, said loose wheel and the last preceding mentioned wheel having in their proximate faces opposed annular grooves; a friction pulley and a carrier in which it is journaled pivotally mounted on the casing, the pivotal axis of said carrier intersecting the axis of the pulley thereon, said opposed grooves having their contour in section radial with respect to the wheels in the arc of a circle whose center is at said intersection and whose radius is that of the pulley, and means for adjusting the pulley carrier about its pivotal axis.

11. A power transmission mechanism comprising a driving and a driven shaft, a casing in which they are journaled; a differential gear train which connects them; a wheel loose on the driving shaft; direction-reversing gear connections from the same to the initial wheel of the differential train; a brake operating on said loose wheel and means mounted on the casing for applying said brake to hold said wheel against rotation.

12. A power transmission mechanism comprising a driving and a driven shaft, a casing in which they are journaled; a differential gear train which connects them; a wheel loose on the driving shaft; direction-reversing gear connections from the same to the initial wheel of the differential train; a brake operating on said loose wheel; means mounted on the casing for applying said brake to hold said wheel against rotation; a wheel mounted on the driving shaft for rotation therewith facing said loose wheel at the opposite side thereof from the differential train, and adjustable friction transmission pulleys interposed between said two wheels for transmitting, varying and reversing the rotation.

In testimony whereof, I have hereunto set my hand at Chicago, Illinois, this 9th day of July, 1910.

DAVID NETTENSTROM.

Witnesses:
   CHAS. S. BURTON,
   M. GERTRUDE ADY.